United States Patent
Medina et al.

(10) Patent No.: US 10,239,603 B2
(45) Date of Patent: Mar. 26, 2019

(54) UPPER ATTACHMENT FOR TRIMMABLE HORIZONTAL STABILISER ACTUATOR

(71) Applicant: Goodrich Actuation Systems SAS, Buc (FR)

(72) Inventors: Raphael Medina, Ecouen (FR); Anh-Vu Abdul-Bari, Franconville (FR)

(73) Assignee: GOODRICH ACTUATION SYSTEMS SAS, Buc (FR)

(*) Notice: Subject to any disclaimer, the term of this patent is extended or adjusted under 35 U.S.C. 154(b) by 404 days.

(21) Appl. No.: 15/080,813

(22) Filed: Mar. 25, 2016

(65) Prior Publication Data
US 2016/0280356 A1    Sep. 29, 2016

(30) Foreign Application Priority Data

Mar. 26, 2015 (EP) .................................... 15305440

(51) Int. Cl.
| | |
|---|---|
| *F16H 25/00* | (2006.01) |
| *B64C 5/10* | (2006.01) |
| *B64C 13/28* | (2006.01) |
| *B64C 5/02* | (2006.01) |
| *B64C 9/02* | (2006.01) |
| *F16H 25/22* | (2006.01) |
| *F16H 25/24* | (2006.01) |
| *F16H 25/20* | (2006.01) |

(52) U.S. Cl.
CPC .................. *B64C 5/10* (2013.01); *B64C 5/02* (2013.01); *B64C 9/02* (2013.01); *B64C 13/28* (2013.01); *F16H 25/205* (2013.01); *F16H 25/2209* (2013.01); *F16H 25/2454* (2013.01); *F16H 25/2204* (2013.01); *F16H 2025/2037* (2013.01)

(58) Field of Classification Search
CPC ............. F16H 25/2204; F16H 25/2209; F16H 25/2454; B64C 13/28
See application file for complete search history.

(56) References Cited

U.S. PATENT DOCUMENTS

| | | | |
|---|---|---|---|
| 6,672,540 B1 | 1/2004 | Shaheen et al. | |
| 7,866,602 B2 * | 1/2011 | Port-Robach | ........... B64C 13/28 244/99.2 |
| 8,281,678 B2 | 10/2012 | Cavalier et al. | |

(Continued)

FOREIGN PATENT DOCUMENTS

| | | |
|---|---|---|
| FR | 2858035 A1 | 1/2005 |
| FR | 2893910 A1 | 6/2007 |

OTHER PUBLICATIONS

Extended European Search Report; Application No. 15305440.8-1757; dated Nov. 12, 2015; 5 pages.

*Primary Examiner* — David M Fenstermacher
(74) *Attorney, Agent, or Firm* — Cantor Colburn LLP (57) ABSTRACT

An upper attachment system for a trimmable horizontal stabilizer actuator (THSA) comprises: a housing, holding a yoke and a ballscrew; a nut coupled to the housing and cooperating with the ballscrew such that rotation of the ballscrew relative to the nut results in linear motion of the ballscrew; a recess formed between the yoke and the ballscrew and arranged to receive, in use, an upper part of a tie bar of the secondary load path of the actuator; and a biasing mechanism arranged such that, in use, when no axial load is applied to the tie bar, the yoke and the ballscrew are held by balanced forces from the biasing mechanism in a position within the recess.

16 Claims, 4 Drawing Sheets (56) References Cited

U.S. PATENT DOCUMENTS

| | | | |
|---|---|---|---|
| 8,393,568 B2* | 3/2013 | Maresko | B64C 13/28 |
| | | | 244/215 |
| 8,596,154 B2 | 12/2013 | Cavalier et al. | |
| 8,702,034 B2 | 4/2014 | Moulon et al. | |
| 8,702,035 B2* | 4/2014 | Elliott | B64C 25/30 |
| | | | 244/102 R |
| 9,821,843 B1* | 11/2017 | Fenton | B62D 7/20 |
| 2007/0018040 A1* | 1/2007 | Wingett | B64C 13/00 |
| | | | 244/99.4 |
| 2008/0315040 A1* | 12/2008 | Moalic | B64C 13/28 |
| | | | 244/220 |
| 2010/0001125 A1* | 1/2010 | Cavalier | B64C 13/28 |
| | | | 244/99.3 |
| 2013/0105623 A1 | 5/2013 | Moulon | |
| 2013/0313358 A1 | 11/2013 | Hale | |

* cited by examiner

United States Patent US 10,239,603 B2

UPPER ATTACHMENT FOR TRIMMABLE HORIZONTAL STABILISER ACTUATOR

FOREIGN PRIORITY

This application claims priority to European Patent Application No. 15305440.8 filed 26 Mar. 2015, the entire contents of which is incorporated herein by reference.

TECHNICAL FIELD

The invention relates to an upper attachment for a flight actuator such as a trimmable horizontal stabiliser actuator. In particular, it relates to adaptations to elements for use in a secondary load path of the upper attachment for an actuator that has a primary load path and a secondary load path.

BACKGROUND OF THE INVENTION

Figure 1:
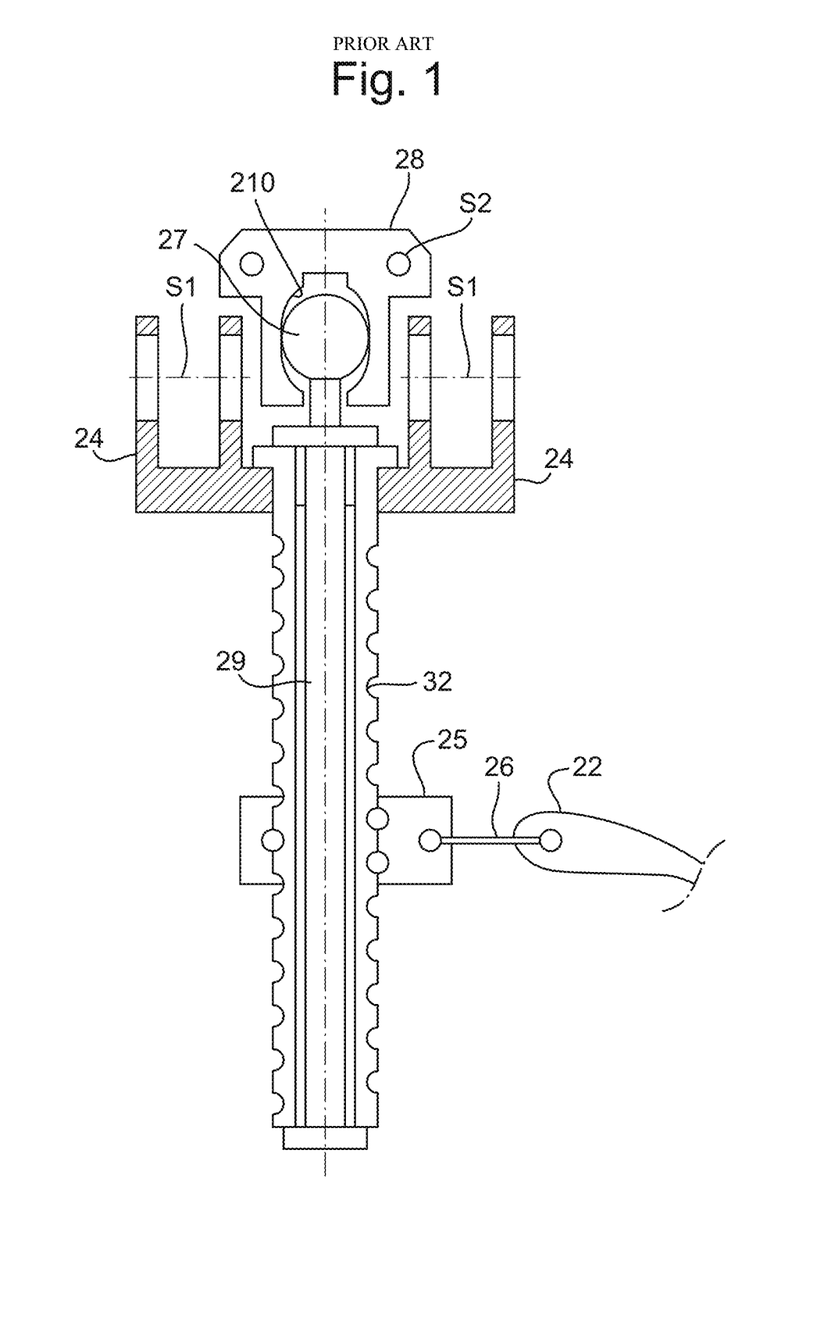
FIG. 1 discloses a prior art flight actuator.

It is well known for flight actuator to include two mechanical load paths, one primary and the other secondary, with the latter intended to take up the load when the primary path has failed. In a typical prior art device, as shown in FIG. 1, when operating on the primary load path the loads are transmitted through a hollow ball or roller screw. The hollow screw houses a safety rod, also called a failsafe bar or tie bar, which is connected to the screw with a small amount of play. During normal operation of the screw, when the primary load path is working correctly, the secondary load path formed by this tie bar carries no load since there is no contact due to the small amount of play. However, in the event of a failure of the screw in the primary load path then the tie bar performs its failsafe function and ensures continuity of the transmission of loads by the actuator.

With reference to FIG. 1 a typical known flight control actuator of the trimmable horizontal stabiliser actuator (THSA) type includes a primary load path with a hollow screw 32 connected at its upper end to the aircraft via a Cardan joint system 24 joining with first aircraft structural elements S1. The primary load path further includes a nut assembly 25 mounted on the screw 33, and the nut assembly 25 is connected to the stabiliser 22 of the aircraft, this connection being achieved for example by another Cardan joint system 26.

As mentioned above, the secondary load path is provided by means of a tie bar 29 which is within the screw 32. The tie bar 29 is terminated at its upper end by a male portion, in this case taking the form of a spherical head 27, which is mounted within a female portion on a fastening piece 28, in this case taking the form of a recess 210. The fastening piece 28 is connected to the structure of the aircraft via second aircraft structural elements S2. The known system may also include some means for preventing motion of the nut assembly 25 relative to the screw 32 and/or for fixing the stabiliser 22/Cardan joint 26 in place when the primary load path fails. Thus, the lower attachment, of which the nut assembly 25 is a part, could also include secondary load path elements used when the primary load path fails.

In the example known upper attachment shown in FIG. 1 it will be understood that should the screw 32 fail then load can be carried by the secondary load path since movement of the spherical head 27 is restricted by the upper and lower shoulders of the recess 210. Consequently, the stabiliser 22 can either be safely held in a single position (in the case where the lower attachment locks in place) or in some prior art arrangements it might be permitted to continue normal movement should the tie bar 29 be connected with the ballscrew 23 in such a way as to permit continued rotation of the screw 23 even after failure preventing it from carrying axial loads.

A flight actuator with the basic features discussed above can be found in the prior art, for example in U.S. Pat. No. 8,702,034 and in US 2013/105623.

SUMMARY

Viewed from a first aspect, the invention provides an upper attachment for a trimmable horizontal stabiliser actuator, the upper attachment comprising: a housing holding a yoke and a ballscrew; a nut coupled to the housing and cooperating with the ballscrew such that rotation of the ballscrew relative to the nut results in linear motion of the ballscrew; a recess formed between the yoke and the ballscrew and arranged to receive, in use, an upper part of a tie bar of the secondary load path of the actuator; and a biasing mechanism arranged such that, in use, when no axial load is applied to the tie bar the yoke and the ballscrew are held by balanced forces from the biasing mechanism in a position with the recess being larger than the upper part of the tie bar, and such that when, in use, an axial load is applied to the yoke by the upper part of the tie bar the balanced forces from the biasing mechanism are overcome and the axial load along with the biasing mechanism results in linear motion of the ballscrew in a first axial direction relative to the nut, wherein the linear motion moves the ballscrew toward the yoke and closes the recess around the upper part of the tie bar.

With the above arrangement when an axial load is applied to the tie bar, which would typically occur when the primary load path has failed and load is transferred to the secondary load path, then the recess in the upper attachment, which normally holds the upper part of the tie bar with some play to ensure that no load is transferred, will close around the tie bar upper part enabling it to be held securely and cancelling backlash in the system to thereby reduce or completely avoid "flutter" of the aircraft elements held by the actuator, for example flutter of the trimmable horizontal stabiliser. If flutter is allowed to occur without restriction then the performance of the aircraft is adversely affected and in the worst case the pilot may lose control.

It will be appreciated that the upper attachment is arranged to connect to an upper part of the tie bar and hence is designed to cooperate with an upper part which is typically of specific shape. The yoke and the ballscrew therefore may be arranged with respective upper and lower surfaces forming the recess in a shape for cooperation with the shape of the upper part of the tie bar, for example for cooperation with a spherical shape in the case that the tie bar includes a spherical head. Other geometries could of course be used when the head of the tie bar has a different shape. The tie bar itself is not an essential part of the upper attachment, but may be included as a part of the claimed device in some examples. Thus, the invention may extend, in example implementations, to an apparatus for a flight actuator including a tie bar fitted within an upper attachment as described herein, for example a trimmable horizontal stabiliser actuator comprising a tie bar in a secondary load path of the actuator, the tie bar being coupled to an upper attachment as described herein.

Preferably the yoke includes a passageway through which a portion of the tie bar passes. In this case the yoke may hence include a shoulder, in use, that cooperates with the upper part of the tie bar, with the yoke encircling a portion of the tie bar that extends out of and away from the upper attachment. The passageway of the yoke is advantageously smaller than the upper part of the tie bar so that, in use, the tie bar is securely held with the upper part of the tie bar within the recess of the upper attachment.

The upper attachment may have an axial direction, with this axial direction being generally aligned, in use, with the axial direction of the tie bar. Along the axial direction of the upper attachment a downward direction may be defined as the direction in which, in use, the tie bar extends from the upper attachment. The downward direction may hence be aligned with the first axial direction. With this definition of downward, the yoke may be below the ballscrew with the recess being formed by an upper surface or shoulder of the yoke and a lower surface of the ballscrew. The nut may be around an outer surface of the ballscrew, and optionally above the lower surface of the ballscrew. In one example the nut is attached to an upper part of the housing.

In an example the upper attachment comprises a no back system for preventing reverse rotation of the ballscrew relative to the nut and hence for preventing linear motion of the ballscrew in a second direction opposite to the first direction. It will be appreciated that it would be possible for the ballscrew to rotate relative to the nut with the nut being fixed to the housing and the ballscrew hence moving in a rotating and in a linear fashion. Whilst this may be a feature of some implementations, it is possible for the nut to be arranged to rotate relative to the housing and the ballscrew, with the ballscrew hence moving only linearly and not with rotation. With this feature there is no relative rotation of the ballscrew and the upper part of the tie bar. It can also facilitate implementation of the no back system.

Preferably the no back system is arranged to resist relative rotation of the nut and the ballscrew when an axial load is applied to the ballscrew. This may ensure that the ballscrew cannot move away from the yoke when, in use, there is an axial load on the tie bar. Thus, in the example where the tie bar is part of a secondary load path then when the secondary load path is loaded the ballscrew can only tighten against the yoke keeping the recess closed and clamping the upper part of the tie bar in place. When the nut rotates relative to the housing then one possible no back system is a friction disc arranged to provide a friction force resisting rotation of the nut relative to the housing.

The biasing mechanism may comprise one or more springs. There may be a centre spring arranged to provide a force urging the yoke away from the ballscrew, thereby keeping the recess open when no axial load is applied. There may be a lower spring pushing the yoke in the axial direction upwardly (thus, opposite to the first axial direction). In one example the lower spring is mounted between the housing and the yoke pushing the yoke axially upward away from the lower part of the housing. Preferably both the centre spring and the lower spring are present and are arranged such that when, in use, there is no axial load the ballscrew is urged upward and the recess is larger than the upper part of the tie bar.

The biasing mechanism may comprise an upper spring arranged to provide a force urging the ballscrew in a downward direction. In one example the upper spring is mounted between the housing and the ballscrew pushing the ballscrew axially downward away from the upper part of the housing. The use of an upper spring can aid downward movement of the ballscrew when an axial load has, in use, overcome the balanced force of the biasing mechanism and the ballscrew starts to move downward.

In one example the biasing mechanism includes a lower spring, a centre spring and an upper spring, with the lower spring urging the yoke upwardly away from a lower part of the housing, the centre spring urging the yoke and ballscrew away from each other axially, and the upper spring urging the ballscrew downwardly away from an upper part of the housing, and the three springs being arranged such that when, in use, no axial load is applied to the yoke or the ballscrew then the ballscrew and the yoke are in stable equilibrium with the recess in its open configuration.

With the use of springs as discussed above, when the tie bar applies an axial load on the yoke then the lower spring will be compressed and the forces from the biasing mechanism will become unbalanced so that the ballscrew is urged in the first direction toward the yoke (for example, in the downward axial direction of the upper attachment) due to forces transmitted by the centre spring and optionally due to the urging force of the upper spring. Therefore, the ballscrew moves linearly in the first direction with relative rotation of the nut and the ballscrew in order to close the recess and thereby clamp the upper part of the tie bar, in use, in the recess.

It is possible to achieve an effective and stable system simply with the use of a biasing mechanism as described above. However, the upper attachment may include a locking system to avoid inadvertent actuation of the system, for example movement of the ballscrew occurring when the aircraft is subject to high acceleration forces. Hence, there may be a locking system for preventing movement of the ballscrew unless a sufficiently large force is applied. The locking system may be arranged to fix the ballscrew in place unless an axial force above a certain threshold is applied. One possible example of a locking system includes a latch device mounted resiliently between the ballscrew and the housing, wherein sufficient axial force will overcome the resilience of the latch device and allow relative axial movement of the ballscrew and the housing. The latch device may for example comprise a pin or ball urged by a resilient biasing device in a direction extending perpendicular to the axial direction of the upper attachment toward a contoured recess, wherein when there is a sufficient axial force the interaction between the contoured recess and the pin or ball will push the pin or ball against the force of the resilient biasing device enabling it to escape the recess and permitting relative axial movement of the ballscrew and the housing. A latch device of this type may have the recess on the ballscrew with the pin or ball being mounted on the housing, or vice versa.

It is an advantage if the aircrew can be alerted when the recess is closing and the backlash cancellation system of the proposed upper attachment has been actuated. Thus, some example implementations may include a sensor for detecting movement of the ballscrew. There may be an inductive sensor between the ballscrew and the upper part of the housing arranged to detect when the ballscrew moves in the first direction away from the upper part of the housing.

The upper attachment may include a coupling for joining to the aircraft structure. This part of the upper attachment may include brackets or the like arranged in a conventional fashion.

Viewed from a second aspect the invention provides a method for avoiding backlash in a secondary load path upper attachment for a flight actuator, wherein the upper attachment receives an upper part of a tie bar of the secondary load path and the tie bar is unloaded in normal use and receives an axial load when a primary load path of the actuator fails and load is transferred to the secondary load path, and the upper attachment comprises a recess for holding the upper part of the tie bar with the recess being larger than the upper part of the tie bar in normal use, the method comprising: providing a yoke and a ballscrew held by a housing of the upper attachment, with a nut being coupled to the housing and cooperating with the ballscrew such that rotation of the ballscrew relative to the nut results in linear motion of the ballscrew; and using a biasing mechanism in order to bias the yoke and the ballscrew relative to the housing such that when no axial load is applied to the tie bar the yoke and the ballscrew are held by balanced forces from the biasing mechanism in a position with the recess being larger than the upper part of the tie bar, and such that when, in use, an axial load is applied to the yoke by the upper part of the tie bar the balanced forces from the biasing mechanism are overcome and the axial load along with the biasing mechanism results in linear motion of the ballscrew in a first direction relative to the nut, wherein the linear motion moves the ballscrew toward the yoke and closes the recess around the upper part of the tie bar.

With this method, the undesirable "flutter" of components coupled to the actuator can be avoided. The method may include use of the upper attachment described above including any or all of the optional features set out above.

BRIEF DESCRIPTION OF DRAWINGS

Certain exemplary embodiments of the invention will now be described by way of example only and with reference to the accompanying drawings in which.

DETAILED DESCRIPTION OF THE INVENTION

Figure 2:
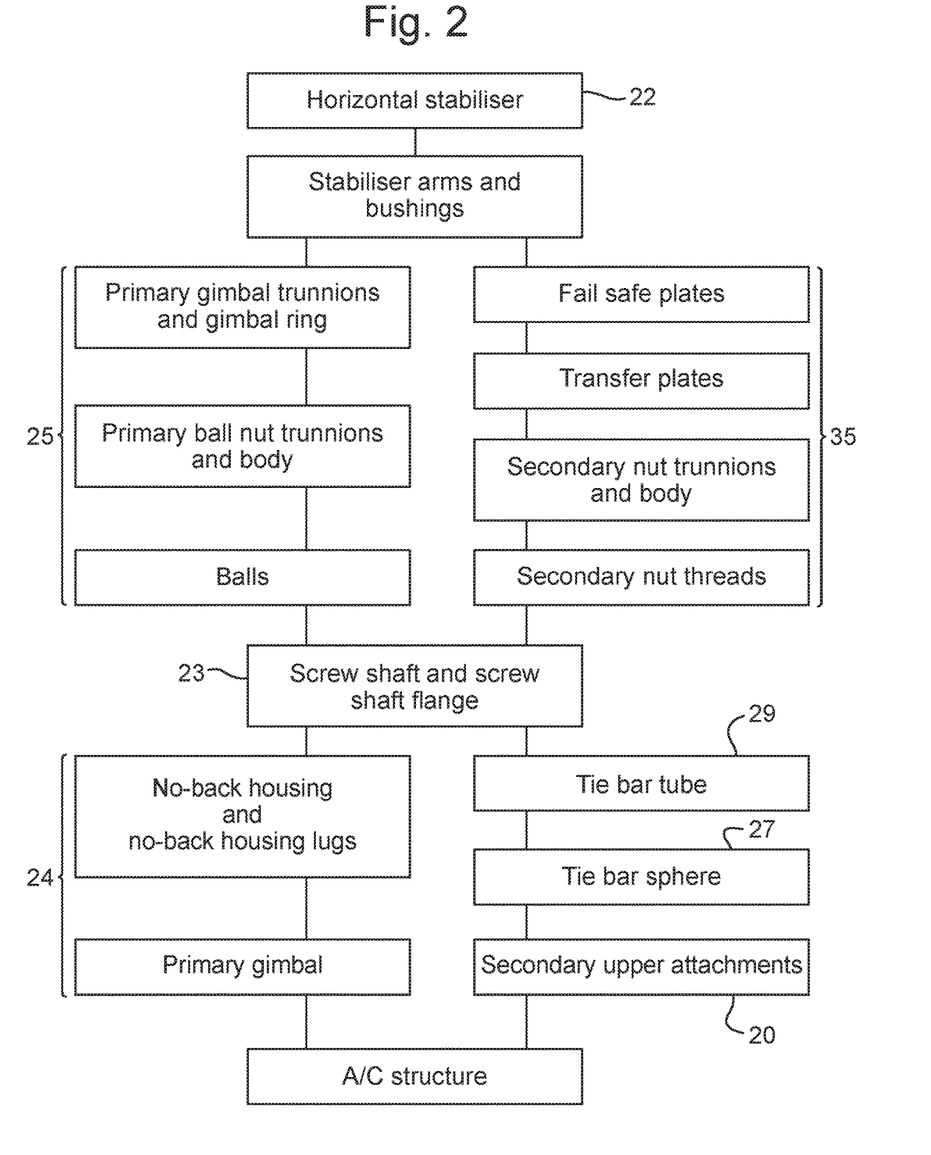
FIG. 2 illustrates a typical arrangement for primary and secondary load paths in a typical horizontal stabiliser actuator (THSA)

One possible arrangement for primary and secondary load paths in a THSA is shown in FIG. 2. A horizontal stabiliser 22 is connected by stabiliser arms and bushings to a nut assembly 25 which connects it to a screw 23. In this case the nut assembly 25 includes a gimbal assembly with primary gimble trunnions and a gimbal ring connected to primary ball nut trunnions and a ball nut body, which is coupled via balls to the screw shaft of the screw 23. The nut assembly 25 forms the lower attachment of the actuator in the primary load path. At the upper end of the actuator a joint system such as a Cardan joint system 24 will typically include no back elements along with the primary load path gimbal, which is coupled to the aircraft structure. During normal use, without any failure, the loading for the actuator is carried via the primary path.

In the event of a failure of the primary path the loading is transferred to the secondary path. In this example at the lower attachment the horizontal stabiliser 22 is connected by the stabiliser arms and the bushings to a secondary load path lower attachment 35 comprising failsafe plates and transfer plates coupled via secondary nut trunnions and a secondary nut body to secondary nut threads which are joined to the thread of the screw 23 when the secondary load path is engaged. Typically the secondary nut threads would be arranged to lock with the threads of the screw 23 preventing movement of the horizontal stabiliser 22 when the secondary load path is engaged. From the lower attachment 35 the load in the secondary load path is transmitted via the screw 23 along the tie bar tube/rod 29 through the male end of the tie bar rod, which in this example is a tie bar sphere 27, and to the secondary load path upper attachment 20.

In this situation it will be understood that the horizontal stabiliser can be rigidly connected to the screw shaft 23 and through the tie bar tube 29 to the tie bar sphere 27 which is held by the upper attachment 20, and that therefore aerodynamic loading applied to the horizontal stabiliser during flight will result in dynamic loading on the connection between the tie bar sphere and the secondary upper attachment 20. It has been realised that this can result in undesirable "flutter" potentially causing degradation in aircraft performance and even a loss of control for the pilot. Consequently, an upper attachment 20 is proposed that incorporates a system for cancellation of the backlash that is necessarily present when the secondary load path is unloaded.

Figures 3A, 3B:
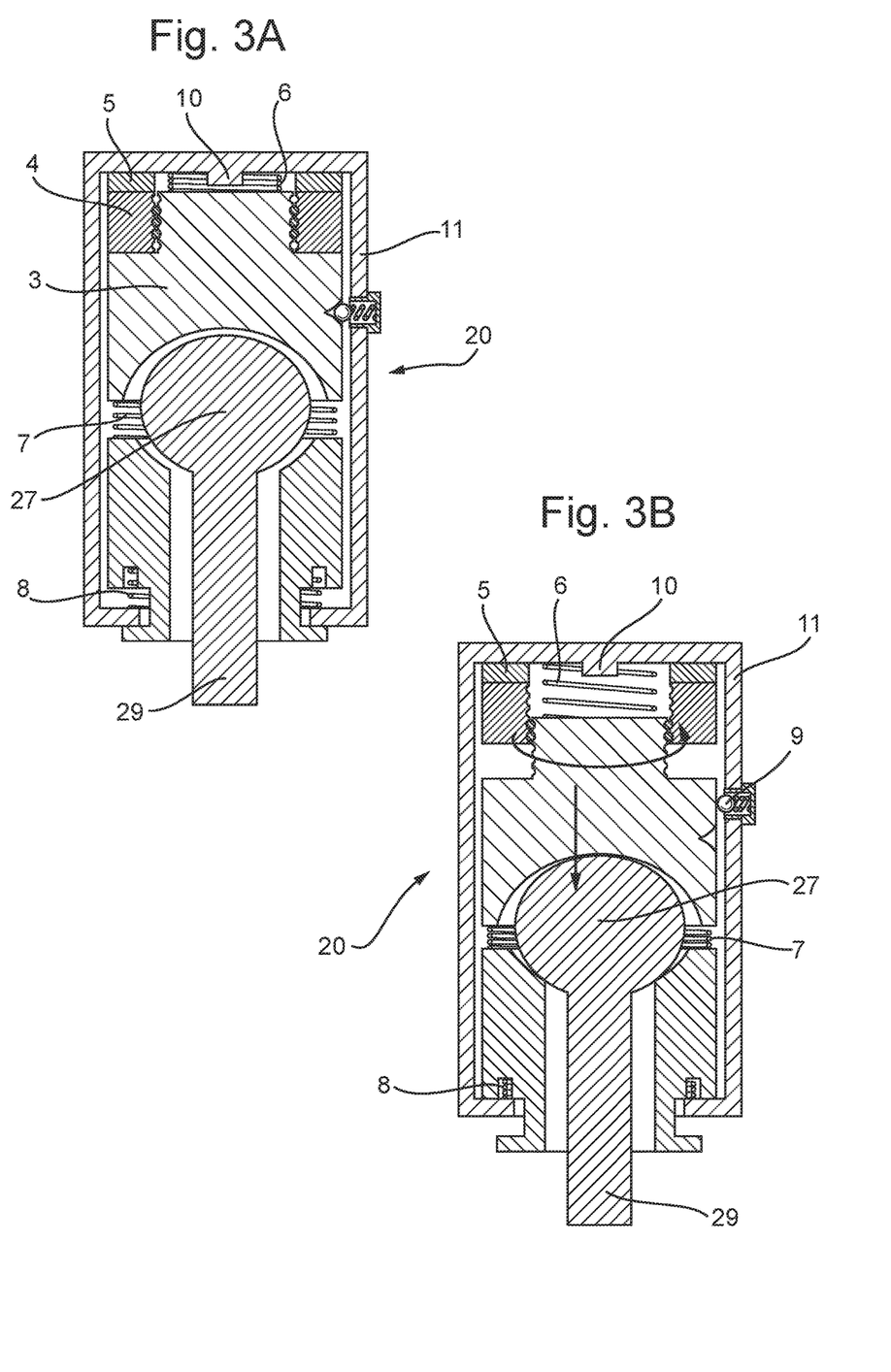
FIGS. 3A and 3B show schematic diagrams for an upper attachment for a THSA illustrating the principles of a backlash cancellation system.

FIGS. 3A and 3B show an example of such an upper attachment 20 with a backlash cancellation system. It will be understood that this could be used in the context of the actuator of FIG. 1 in place of the upper fastening 28. As shown in FIG. 3A, the upper attachment holds a tie bar 29 of the secondary load path with the male portion 27 of the tie bar head held within a recess formed by a yoke 2 and a ballscrew 3. The ballscrew 3 is coupled to a nut 4 mounted with a no-back system 5. The upper attachment 20 includes a housing 11 to which the nut 4 is mounted, and the ballscrew 3 along with the yoke 2 interact with each other and with the housing through springs 6, 7, 8, a ball locking system 9 and a sensor 10.

The upper surface of the yoke 2 is formed as a shoulder shaped to cooperate with the upper portion 27 of the tie bar 29 when the tie bar 29 is in a downward position, for example when it is under a tensile load. The lower surface of the ballscrew 3 is also shaped to cooperate with the upper portion 27 of the tie bar 29. In FIG. 3A the upper attachment is shown in the condition when there is no load on the tie bar 29, i.e. when the secondary load path is not carrying any load. As noted above in this situation a certain amount of play is permitted, i.e. a physical gap is present, between the tie bar 29 and its upper part 27 and the upper attachment 20. When the primary load path fails then axial load will be applied to the tie bar 29 as a consequence of aerodynamic loading on the horizontal stabiliser being passed via the lower attachment and the screw 23 to the tie bar 29. When this occurs, then the upper attachment will move to the configuration shown in FIG. 3B, where the backlash present prior to failure is cancelled and the upper part 27 of the tie bar is held without any play by the upper attachment 20. This has the advantage that there will be no "flutter", and consequently no possibility of a detrimental effect on the performance of the aircraft due to flutter when the secondary load path is carrying the load for the actuator.

The cooperation between the yoke 2 and the tie bar 29 may be such that the tie bar 29 is not permitted to move in a lateral/horizontal direction (in relation to the orientation of FIG. 3B). Alternatively, the cooperation may be such that the tie bar 29 is permitted a limited degree of movement. For example, as shown FIG. 3B, the upper portion of the tie bar 29 is substantially spherical, while the upper surface of the yoke 2 includes a substantially hemispherical recess with which the tie bar 29 cooperates. Thus, the tie bar 29 is permitted limited rotational movement while resting in the yoke 2. Further, the radius of curvature of the hemispherical recess of the yoke 2 may be larger than that of the upper portion of the tie bar 29, thereby permitting limited horizontal translation of the tie bar 29 within the recess under sufficient lateral loads. Of course, other configurations of the yoke 2 and the tie bar 29 are possible.

The yoke 2 includes a passageway through which the lower portion of the tie bar 29 is threaded. The passageway in the yoke 2 is wider than the lower portion of the tie bar 29, as shown in FIG. 3A. The passageway may be significantly wider than the lower portion of the tie bar 29, allowing limited lateral movement of tie bar, or the passageway may be sized only slightly wider than the lower portion of the tie bar 29, thereby preventing lateral movement of the tie bar 29. Importantly, the passageway enables vertical movement of the tie bar 29 therethrough.

The yoke 2 is disposed within the housing 11 and is coupled to the housing via the lower spring 8. The lower spring 8 forces the yoke 2 in an upward direction. The lower end of a second, centre spring 7 is fixed to the upper surface of the yoke 2 and is oriented in a vertical direction. The upper end of the centre spring 7 is fixed to the ballscrew 3 by suitable means. Thus, spring 7 connects ballscrew 3 and the yoke 2. During normal operation, when the secondary load path is unloaded, the spring 7 is compressed and thus forces the yoke 2 and the ballscrew 3 away from each other.

The tie bar 29 is disposed below the ballscrew 3, and the ballscrew 3 includes a substantially hemispherical recess in its lower surface that cooperates with the upper portion of the tie bar 29. It will be appreciated that different geometries could be used, but it is common to have a spherical upper part 27. The upper portion of the ballscrew 3 has a threaded portion that cooperates with the nut 4. The nut 4 is disposed around the threaded portion of ballscrew 3 and is supported for rotation within the housing 11 on bearings (not shown in FIGS. 3A and 3B). The bearings allow for the rotation of nut 4 and fix its vertical position with respect to the housing 11. The upper surface of nut 4 contacts no-back device 5, which ensures that nut 4 can rotate in one direction only. No-back device 5 may be any suitable device for preventing the reverse movement of the ballscrew 23 when the tie rod 29 is loaded. In this example the no-back device 5 is a friction plate.

An upper spring 6 is disposed between the upper surface of ballscrew 3 and the top part of the housing 11. In normal operation when the secondary load path is unloaded, the upper spring 6 is compressed and serves to bias ballscrew 3 in a downward direction.

In order to determine when the secondary load path is loaded, a sensor 10 is disposed on the upper surface of the housing 11, above the ballscrew 3. The sensor 10 is operable to detect the movement of ballscrew 3 away from the housing 11 and may be an inductive sensor. Particularly, the sensor 10 can detect when the ballscrew 3 deploys in a downward direction.

The ballscrew 3 further includes a recess that is cooperable with the ball locking system 9 to hold ballscrew 3 in place during normal operation when the secondary load path is unloaded. The ball locking system 9 comprises a ball and a spring and is disposed adjacent the housing 11. The ball locking system 9 may be formed in the side of the housing, or may be separate. The recess in the ballscrew 3 receives the ball from the ball locking system 9, and the ball is forced against ballscrew 3 by the spring. Therefore, in normal operation, when the secondary load path is unloaded, the spring 6 serves to bias ballscrew 3 in a downward direction and the spring 7 serves to bias it in an upward direction, while ball locking system 9 urges its ball against ballscrew 3, thereby preventing its movement and holding ballscrew 3 in a ready state.

The yoke 2 and the ballscrew 3 are spaced apart so that the upper portion of the tie bar 29 is permitted limited movement therebetween. This allows the tie bar 29 a limited amount of movement before the backlash cancellation system is deployed and ensures that no load is carried on the secondary load path when the primary load paths is loaded.

In the event that the primary load path fails, it is advantageous that flutter of the trim flaps is minimised. Failure of the primary load path results in the tie bar 29 being pulled axially by a tensile load, downward in the orientation shown in FIG. 3B. When this happens, the upper portion 27 of the tie bar 29 contacts the upper shoulder of the yoke 2 and forces the yoke 2 downwards compressing the lower spring 8. This causes spring 7 to extend, thereby reducing the compressive load between the yoke 2 and ballscrew 3.

When the tensile load on the tie bar 29 is large enough, i.e. when the lower spring 8 is compressed enough, the subsequent upward force exerted by the centre spring 7 on ballscrew 3 is insufficient to overcome the urging of the upper spring 6 and the resistance of the ball locking system 9 holding ballscrew 3 in place. The spring of the ball locking system 9 is then compressed and the ballscrew 3 is freed to move downwards. When the ballscrew 3 is freed from the ball locking system 9 and the spring 6 provides a force larger than the opposing force from the spring 7 then the ballscrew 3 moves in a downward direction.

The downward movement of the ballscrew 3 occurs with the nut 4 rotating in a first direction. When there is an axial force applied then the no-back system 5 prevents the nut 4 from turning in the opposite direction, and therefore prevents ballscrew 3 from rising back upwards once deployment has begun. Thus, when the secondary load path is loaded then the ballscrew 3 can only move downwards tightening the grip of the upper attachment 20 on the upper part 27 of the tie bar 29.

As the ballscrew 3 descends, the upper portion of the tie bar 29 is received within the recess in the lower surface of the ballscrew 3. However, the tie bar 29 cannot force ballscrew 3 upwards, since nut 4 is prevented from counter-rotation by no-back system 5. Thus, as the tie bar 29 is pulled by a tensile load into its lowermost position, ballscrew 3 is deployed from its ready state and descends to hold the upper portion of the tie bar 29 immobile between its lower surface and the yoke 2. Therefore, any further movement of the tie bar 29, such as that which might result in (or be the result of) flutter of trim flaps, is prevented. The backlash cancellation system therefore deploys automatically when the primary load path fails and serves to prevent flutter and improve safety. In prior art designs such as that shown in FIG. 1, where there is always the ability for the upper part 27 of the tie bar 29 to move within its recess 210, backlash is a considerable problem. This backlash is cancelled by the proposed upper attachment 20.

The deployment of the ballscrew 3 is sensed by the sensor 10 and reported in order that the aircrew can be quickly notified of the failure of the primary load path.

The forces required to cause the backlash cancellation device to deploy can be controlled by balancing the forces in the springs 6, 7, 8 and the spring of the ball locking system 9. Fine control over the deployment of the system can therefore be achieved.

The system can be reset by reverse motion of the ballscrew 3 when there is no load applied, and consequently when the no-back device 5 will not be in operation. This reverse motion can be done manually during maintenance, for example after the primary load path components have been repaired or replaced.

Figure 4A:
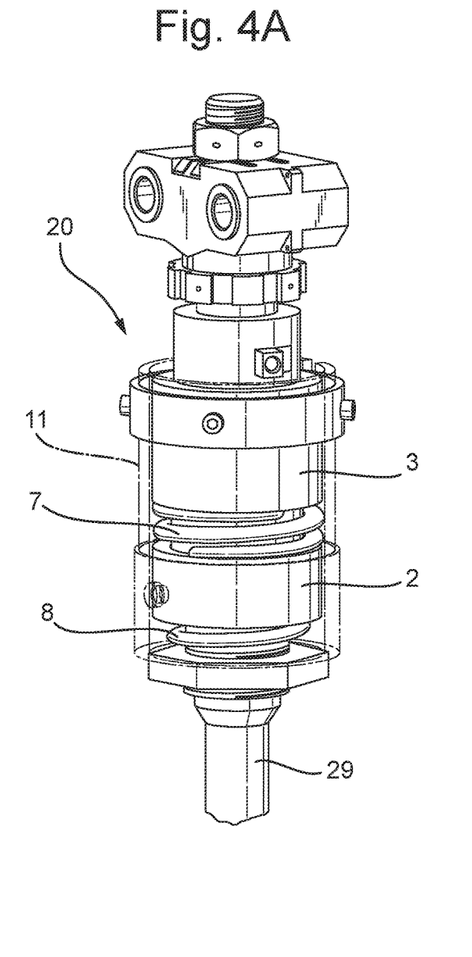
FIGS. 4A and 4B are perspective and cross-section views showing an upper attachment incorporating a backlash cancellation system of the type shown in FIGS. 3A and 3B.
Figure 4B:
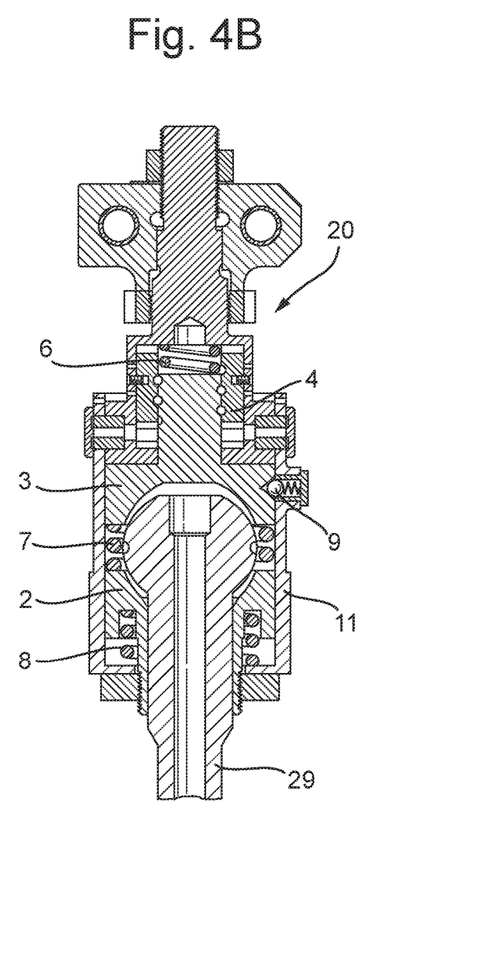

FIGS. 4A and 4B show details of a similar upper attachment 20 in perspective view and cross-section view. All the features discussed above in connection with FIGS. 3A and 3B are included, along with further detail of the attachment mechanism that joins to the aircraft structure. The screw 32 is not shown. The tie bar 29 would be encased by the screw 32 in a conventional manner, and it will of course be appreciated that the lower attachment connections between the screw 32 and the stabiliser 22 could also be implemented in any suitable fashion.

The methods and systems described herein and shown in the drawings provide an upper attachment for a trimmable horizontal stabiliser actuator that improves reliability of operation and the cancellation of backlash. While the apparatus and methods herein have been shown and described with reference to exemplary embodiments, those skilled in the art will appreciate that changes and/or modifications may be made thereto without departing from the scope of the present invention as defined by the appended claims.

The invention claimed is:

1. An upper attachment system for a trimmable horizontal stablizer actuator (THSA), the upper attachment comprising:
    a housing holding a yoke and a ballscrew;
    a nut coupled to the housing and cooperating with the ballscrew such that rotation of the ballscrew relative to the nut results in linear motion of the ballscrew;
    a recess formed between the yoke and the ballscrew and arranged to receive, in use, an upper part of a tie bar of the secondary load path of the actuator; and
    a biasing mechanism arranged such that, in use, when no axial load is applied to the tie bar, the yoke and the ballscrew are held by balanced forces from the biasing mechanism in a position within the recess, and such that when, in use, an axial load is applied to the yoke by the upper part of the tie bar, the balanced forces from the biasing mechanism are overcome and the axial load along with the biasing mechanism results in linear motion of the ballscrew in a first axial direction relative to the nut, wherein the linear motion moves the ballscrew toward the yoke and closes the recess around the upper part of the tie bar;
    wherein the biasing mechanism includes a center spring arranged to provide a force urging the yoke away from the ballscrew.

2. An upper attachment system as claimed in claim 1, wherein the biasing mechanism includes a lower spring pushing the yoke in an opposite axial direction to the first axial direction.

3. An upper attachment system as claimed in claim 2, wherein both the center spring and the lower spring and are arranged such that when, in use, there is no axial load from the tie bar the ballscrew is urged upward.

4. An upper attachment system as claimed in claim 1, wherein the biasing mechanism comprises an upper spring arranged to provide a force urging the ballscrew in the first axial direction.

5. An upper attachment system as claimed in claim 1, wherein the biasing mechanism comprises: a lower spring pushing the yoke in an opposite axial direction to the first axial direction, and an upper spring arranged to provide a force urging the ballscrew in the first axial direction; wherein the lower spring, the center spring and the upper spring are arranged such that when, in use, no axial load is applied to the yoke or the ballscrew by the tie bar then the ballscrew and the yoke are in stable equilibrium with the recess in its open configuration, and further such that when, in use, an axial load is applied to the yoke by the tie bar the lower spring will be compressed and the forces from the biasing mechanism will become unbalanced so that the ballscrew is urged in the first direction toward the yoke and thereby clamps the upper part of the tie bar, in use, in the recess.

6. An upper attachment system as claimed in claim 1, wherein the yoke and the ballscrew are arranged with respective upper and lower surfaces forming the recess in a shape for cooperation with the shape of the upper part of the tie bar.

7. An upper attachment system as claimed in claim 1, wherein the nut is arranged to rotate relative to the housing and the ballscrew.

8. An upper attachment system as claimed in claim 1, comprising a no back system for preventing reverse rotation of the ballscrew relative to the nut.

9. An upper attachment system as claimed in claim 8, wherein the no back system is arranged to resist relative rotation of the nut and the ballscrew when an axial load is applied to the ballscrew.

10. An upper attachment system as claimed in claim 8, wherein the no back system is a friction disc arranged to provide a friction force resisting rotation of the nut.

11. An upper attachment system as claimed in claim 1, wherein the upper attachment further comprises a locking system to avoid inadvertent actuation of the system.

12. An upper attachment system as claimed in claim 11, wherein the locking system includes a latch device mounted resiliently between the ballscrew and the housing, and wherein sufficient axial force on the ballscrew will overcome the resilience of the latch device and allow relative axial movement of the ballscrew and the housing.

13. An upper attachment system as claimed in claim 11, wherein the locking system is arranged to fix the ballscrew in place unless an axial force above a certain threshold is applied.

14. An upper attachment system for a trimmable horizontal stablizer actuator (THSA), the upper attachment comprising:
    a housing holding a yoke and a ballscrew;
    a nut coupled to the housing and cooperating with the ballscrew such that rotation of the ballscrew relative to the nut results in linear motion of the ballscrew;
    a recess formed between the yoke and the ballscrew and arranged to receive, in use, an upper part of a tie bar of the secondary load path of the actuator; and
    a biasing mechanism arranged such that, in use, when no axial load is applied to the tie bar, the yoke and the ballscrew are held by balanced forces from the biasing mechanism in a position within the recess, and such that when, in use, an axial load is applied to the yoke by the upper part of the tie bar, the balanced forces from the biasing mechanism are overcome and the axial load along with the biasing mechanism results in linear motion of the ballscrew in a first axial direction relative to the nut, wherein the linear motion moves the ballscrew toward the yoke and closes the recess around the upper part of the tie bar;
    comprising a no back system for preventing reverse rotation of the ballscrew relative to the nut, wherein the no back system is a friction disc arranged to provide a friction force resisting rotation of the nut.

15. An upper attachment system for a trimmable horizontal stablizer actuator (THSA), the upper attachment comprising:
- a housing holding a yoke and a ballscrew;
- a nut coupled to the housing and cooperating with the ballscrew such that rotation of the ballscrew relative to the nut results in linear motion of the ballscrew;
- a recess formed between the yoke and the ballscrew and arranged to receive, in use, an upper part of a tie bar of the secondary load path of the actuator; and
- a biasing mechanism arranged such that, in use, when no axial load is applied to the tie bar, the yoke and the ballscrew are held by balanced forces from the biasing mechanism in a position within the recess, and such that when, in use, an axial load is applied to the yoke by the upper part of the tie bar, the balanced forces from the biasing mechanism are overcome and the axial load along with the biasing mechanism results in linear motion of the ballscrew in a first axial direction relative to the nut, wherein the linear motion moves the ballscrew toward the yoke and closes the recess around the upper part of the tie bar;
- wherein the upper attachment further comprises a locking system to avoid inadvertent actuation of the system; and
- wherein the locking system includes a latch device mounted resiliently between the ballscrew and the housing, and wherein sufficient axial force on the ballscrew will overcome the resilience of the latch device and allow relative axial movement of the ballscrew and the housing.

16. An upper attachment system as claimed in claim 15, wherein the locking system is arranged to fix the ballscrew in place unless an axial force above a certain threshold is applied.

\* \* \* \* \*